US012665709B2

(12) United States Patent
Vysyaraju et al.

(10) Patent No.: US 12,665,709 B2
(45) Date of Patent: Jun. 23, 2026

(54) DISTRIBUTED HANDLING OF FORWARD ERROR CORRECTION IN HARDWARE ASSISTED VERIFICATION PLATFORMS

(71) Applicant: Siemens Industry Software Inc.,
Plano, TX (US)

(72) Inventors: Amaresh Vysyaraju, Srikakulam (IN);
Amit Kumar Gupta, Noida (IN);
Saurabh Khaitan, Noida (IN);
Sudhanshu Jayaswal, Noida (IN)

(73) Assignee: Siemens Industry Software Inc.,
Plano, TX (US)

( * ) Notice: Subject to any disclaimer, the term of this patent is extended or adjusted under 35 U.S.C. 154(b) by 6 days.

(21) Appl. No.: 18/578,437

(22) PCT Filed: Aug. 31, 2021

(86) PCT No.: PCT/US2021/048318
§ 371 (c)(1),
(2) Date: Jan. 11, 2024

(87) PCT Pub. No.: WO2023/003576
PCT Pub. Date: Jan. 26, 2023

(65) Prior Publication Data
US 2024/0297746 A1 Sep. 5, 2024

(30) Foreign Application Priority Data
Jul. 20, 2021 (IN) .............................. 202111032595

(51) Int. Cl.
*H04L 1/24* (2006.01)
*H04L 1/00* (2006.01)
(52) U.S. Cl.
CPC .............. *H04L 1/24* (2013.01); *H04L 1/0041* (2013.01)

(58) Field of Classification Search
CPC ....... H04L 1/24; H04L 1/0041; H04L 1/0045; H04L 1/0057; G06F 11/1048; G06F 11/261; G06F 30/331
See application file for complete search history.

(56) References Cited

U.S. PATENT DOCUMENTS

2003/0225560 A1* 12/2003 Garcia .................. G06F 30/331
703/17
2017/0140082 A1 5/2017 Suresh et al.
2019/0268018 A1* 8/2019 Brueggen .............. G11C 29/52

OTHER PUBLICATIONS

Bianchi, Valentina et al: "Minimization of Network InducedJitter Impact on FPGA-Based Control Systems for PowerElectronics through Forward Error Correction"; Electronics;vol. 9, No. 2, Feb. 6, 2020; pp. 1-16;XP055908768; D01: 10.3390/electronics9020281.

* cited by examiner

*Primary Examiner* — Thien Nguyen

(57) ABSTRACT

This application discloses distributed forward error correction in hardware assisted verification platforms (300) including a hardware-assisted verification system (320) to emulate an electronic system (322) described by a circuit design (301). The hardware-assisted verification system (320) can implement forward error correction circuitry (324) to analyse a data packet (311) for use by the emulated electronic system (322) during functional verification operations of the circuit design (301), which can identify that the data packet includes one or more corrupted bits (321). The forward error correction circuitry (324) can transmit the corrupted data packet (321) to a computing system (330) implementing an error correction algorithm configured to perform error correction operations (332) on the corrupted data packet (321). The computing system implementing the error correction algorithm (330) can generate a corrected data packet (331) during the error correction operations and transmit the (Continued)

corrected data packet to the hardware-assisted verification system (320) for use by the emulated electronic system (322) during functional verification operations of the circuit design (301).

14 Claims, 4 Drawing Sheets

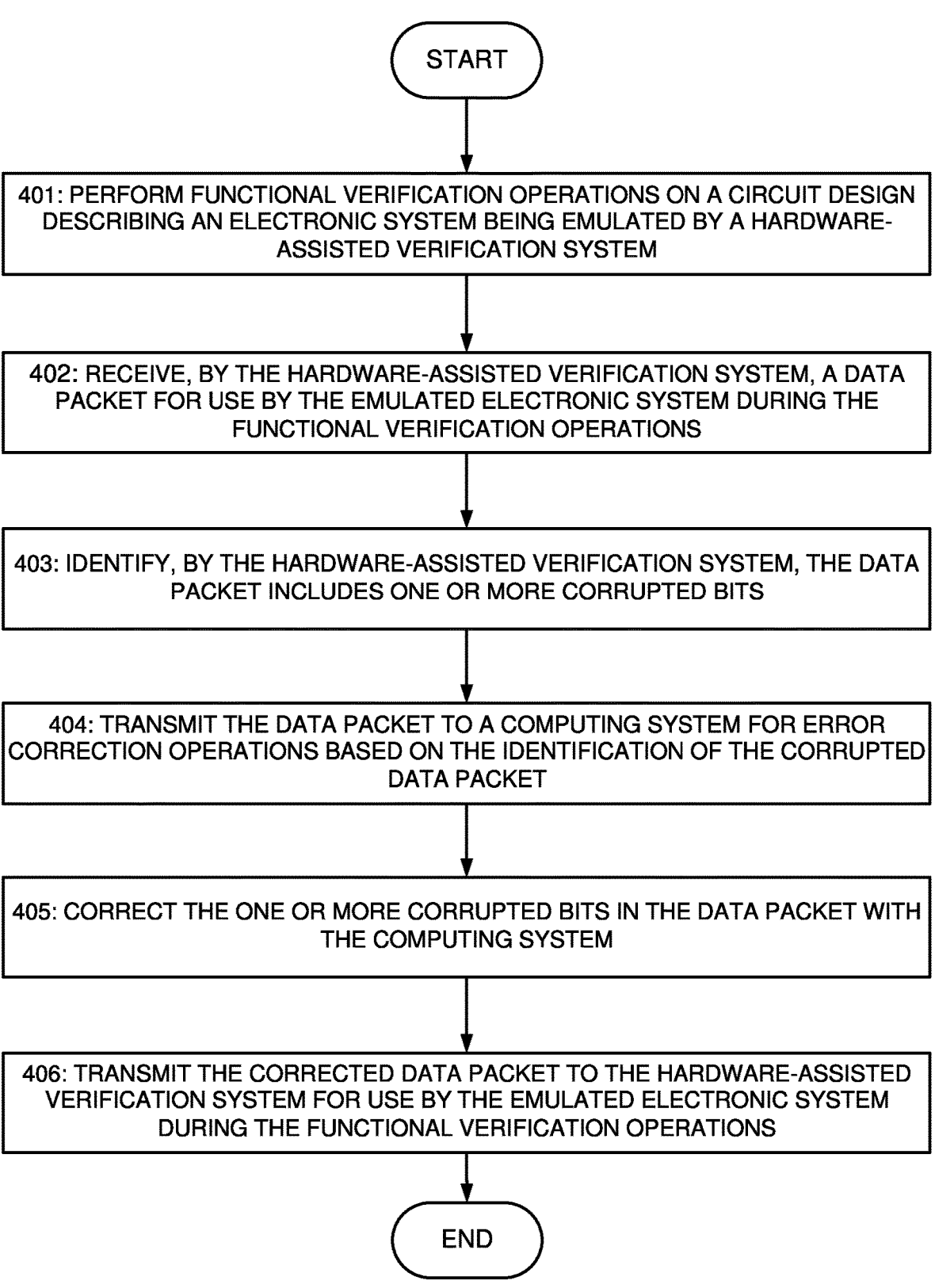

START

401: PERFORM FUNCTIONAL VERIFICATION OPERATIONS ON A CIRCUIT DESIGN DESCRIBING AN ELECTRONIC SYSTEM BEING EMULATED BY A HARDWARE-ASSISTED VERIFICATION SYSTEM

402: RECEIVE, BY THE HARDWARE-ASSISTED VERIFICATION SYSTEM, A DATA PACKET FOR USE BY THE EMULATED ELECTRONIC SYSTEM DURING THE FUNCTIONAL VERIFICATION OPERATIONS

403: IDENTIFY, BY THE HARDWARE-ASSISTED VERIFICATION SYSTEM, THE DATA PACKET INCLUDES ONE OR MORE CORRUPTED BITS

404: TRANSMIT THE DATA PACKET TO A COMPUTING SYSTEM FOR ERROR CORRECTION OPERATIONS BASED ON THE IDENTIFICATION OF THE CORRUPTED DATA PACKET

405: CORRECT THE ONE OR MORE CORRUPTED BITS IN THE DATA PACKET WITH THE COMPUTING SYSTEM

406: TRANSMIT THE CORRECTED DATA PACKET TO THE HARDWARE-ASSISTED VERIFICATION SYSTEM FOR USE BY THE EMULATED ELECTRONIC SYSTEM DURING THE FUNCTIONAL VERIFICATION OPERATIONS

END

FIG. 4

DISTRIBUTED HANDLING OF FORWARD ERROR CORRECTION IN HARDWARE ASSISTED VERIFICATION PLATFORMS

TECHNICAL FIELD

This application is generally related to electronic design automation and, more specifically, to distributed handling of forward error correction in hardware-assisted verification platforms.

BACKGROUND

Designing and fabricating electronic systems typically involves many steps, known as a "design flow." The particular steps of a design flow often are dependent upon the type of electronic system to be manufactured, its complexity, the design team, and the fabricator or foundry that will manufacture the electronic system from a design. Typically, software and hardware "tools" verify the design at various stages of the design flow by running simulators and/or hardware emulators, or by utilizing formal techniques, allowing any errors in the design discovered during the verification process to be corrected.

Initially, a specification for a new electronic system can be transformed into a logical design, sometimes referred to as a register transfer level (RTL) description of the electronic system. With this logical design, the electronic system can be described in terms of both the exchange of signals between hardware registers and the logical operations that can be performed on those signals. The logical design typically employs a Hardware Design Language (HDL), such as System Verilog or Very high speed integrated circuit Hardware Design Language (VHDL).

The logic of the electronic system can be analyzed to confirm that it will accurately perform the functions desired for the electronic system, sometimes referred to as "functional verification." Design verification tools can perform functional verification operations, such as simulating, emulating, and/or formally verifying the logical design. For example, when a design verification tool emulates the logical design, the design verification tool can provide transactions or sets of test vectors, for example, generated by an emulated test bench, to the emulated logical design. The design verification tools can determine how the emulated logical design responded to the transactions or test vectors, and verify, from that response, that the logical design describes circuitry to accurately perform functions.

For large complex electronic circuit design, such as SoC (System-on-Chip) designs or the like, software-based simulation may be too slow, as an execution speed of a simulator can drop significantly as a design size increases due to cache misses and memory swapping. Emulation and prototyping can significantly increase verification productivity by employing reconfigurable hardware modeling devices, such as emulators and prototyping devices, which include programmable logic devices or Field Programmable Gate Arrays (FPGAs) that can be configured to perform circuit verification generally in parallel as the circuit design will execute in a real device.

In order for an emulator to implement the electronic circuit design for functional verification operations, the logical design of the electronic circuit can be synthesized from the register transfer level representation into a gate-level representation, such as a gate-level netlist. The synthesis operations can include RTL synthesis, which can generate generic gates corresponding to the functionality described in the logical circuit design. The gate-level netlist describing the electronic circuit can be compiled into a functionally-equivalent model of the gate-level netlist that, when downloaded to the programmable logic devices or FPGAs in the emulator, can cause the programmable logic devices or FPGAs in the emulator to implement the electronic circuit design described by the gate-level netlist.

With an increase in the speeds for digital applications performed by electronic devices described in the circuit designs, associated noise and corruption of data transmissions has also increased. Forward Error correction (FEC) is a technique that adds redundant bits, such as parity data, during data transmission, which can allow for detection of errors and error correction by receivers of those data transmissions. For example, transmission circuitry can add parity data to a data message, which can create a FEC codeword to be transmitted on a physical interface. A data stream from a device under test can be analyzed for specific synchronization patterns, which can be utilized to identify boundary for data packets or the data messages called as a Frame, a Flit packet, or the like. The blocks of data can be segregated based on the specific protocol into one or many FEC codewords. Each FEC codeword can include an information field and parity field added to ensure data checking and correcting at the receiver side. Receiver circuitry can receive the data message, and provide the data message to a FEC decoder, which can form the FEC codeword from the data message, and calculate a syndrome in the FEC codeword to ascertain whether the data message was corrupted during transmission. When corruption has been found, the FEC decoder can attempt to perform error correction on the data message, for example, to utilize the parity data to restore data message bits having been corrupted by the data transmission.

For hardware implementations, such as an emulator or a prototyping device, implementation of an FEC decoder in the FPGAs consumes significant hardware space, which can limit available resources for verifying circuit designs. In an attempt to recapture the scarce hardware resources of the emulators or prototyping devices, some implementations have elected to offload the FEC decoder from the hardware-assisted verification platform and onto a traditional computer running FEC decoding software. The offloading of the FEC decoding, however, trades-off hardware consumption for speed, which substantially slows the overall performance of the emulators or prototyping devices verification operations.

SUMMARY

This application discloses distributed forward error correction in hardware-assisted verification platforms including a hardware-assisted verification system to emulate an electronic system described by a circuit design. The hardware-assisted verification system can implement forward error detection circuitry to analyze a data packet for use by the emulated electronic system during functional verification operations of the circuit design, which can identify that the data packet includes one or more corrupted bits. The forward error correction circuitry can transmit the corrupted data packet to a computing system implementing an error correction algorithm configured to perform error correction operations on the corrupted data packet. The hardware-assisted verification system, in some embodiments, can pause a verification clock for the functional verification operations on the circuit design in response to the identification that the data packet includes one or more corrupted bits. The computing system implementing the error correction algorithm can generate a corrected data packet during the error correction operations and transmit the corrected data packet to the hardware-assisted verification system for use by the emulated electronic system during functional verification operations of the circuit design. The hardware-assisted verification system, in some embodiments, can restart the verification clock for the functional verification operations on the circuit design in response to the receiving the corrected data packet from the computing system. Embodiments of will be described below in greater detail.

DESCRIPTION OF THE DRAWINGS

FIG. 4 illustrates a flowchart showing example distributed handling of Forward Error Correction (FEC) according to various examples.

DETAILED DESCRIPTION

Illustrative Operating Environment

Figure 1:
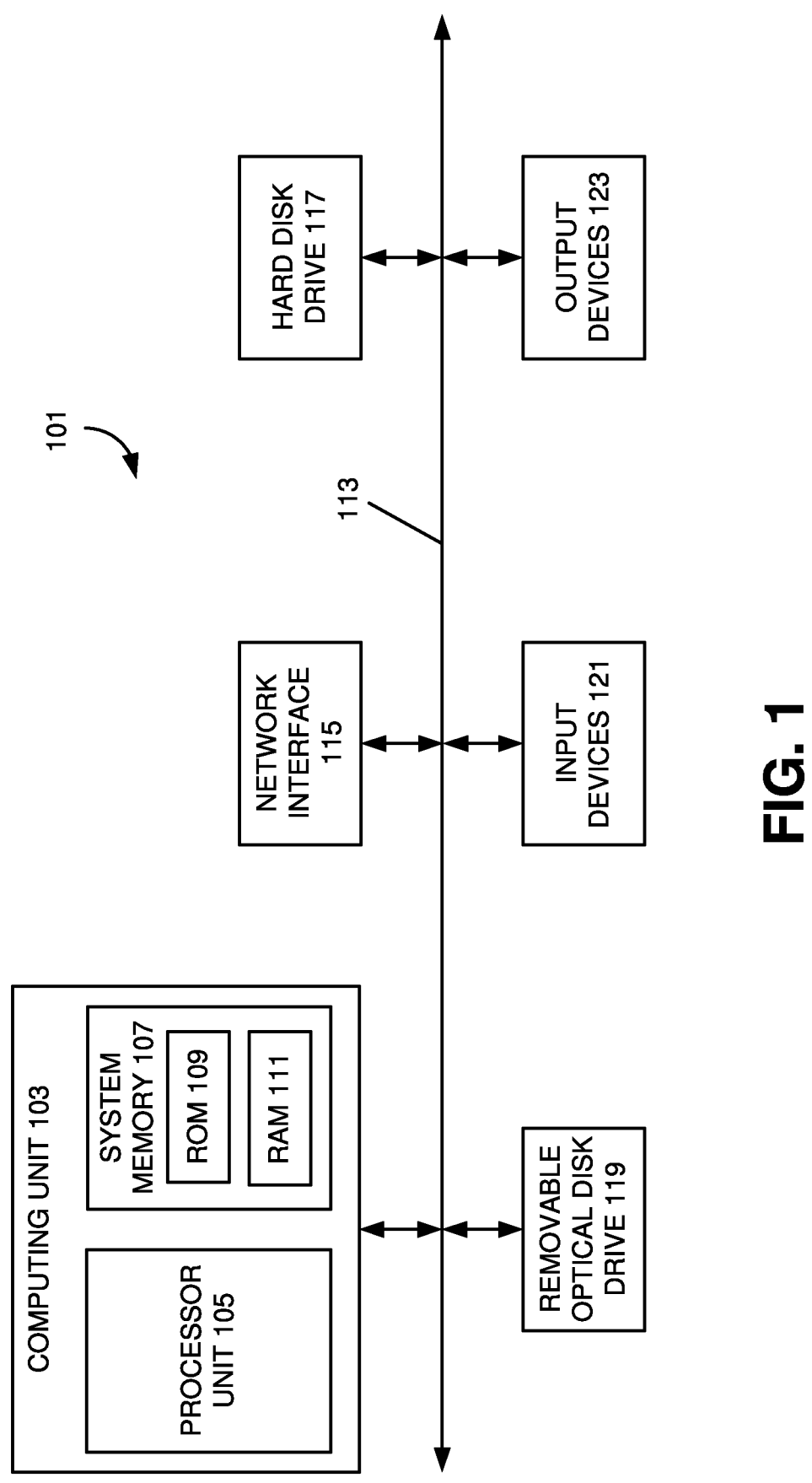
FIGS. 1 and 2 illustrate an example of a computer system of the type that may be used to implement various embodiments.

Various examples may be implemented through the execution of software instructions by a computing device 101, such as a programmable computer. Accordingly, FIG. 1 shows an illustrative example of a computing device 101. As seen in this figure, the computing device 101 includes a computing unit 103 with a processing unit 105 and a system memory 107. The processing unit 105 may be any type of programmable electronic device for executing software instructions, but will conventionally be a microprocessor. The system memory 107 may include both a read-only memory (ROM) 109 and a random access memory (RAM) 111. As will be appreciated by those of ordinary skill in the art, both the read-only memory (ROM) 109 and the random access memory (RAM) 111 may store software instructions for execution by the processing unit 105.

The processing unit 105 and the system memory 107 are connected, either directly or indirectly, through a bus 113 or alternate communication structure, to one or more peripheral devices 115-123. For example, the processing unit 105 or the system memory 107 may be directly or indirectly connected to one or more additional memory storage devices, such as a hard disk drive 117, which can be magnetic and/or removable, a removable optical disk drive 119, and/or a flash memory card. The processing unit 105 and the system memory 107 also may be directly or indirectly connected to one or more input devices 121 and one or more output devices 123. The input devices 121 may include, for example, a keyboard, a pointing device (such as a mouse, touchpad, stylus, trackball, or joystick), a scanner, a camera, and a microphone. The output devices 123 may include, for example, a monitor display, a printer and speakers. With various examples of the computing device 101, one or more of the peripheral devices 115-123 may be internally housed with the computing unit 103. Alternately, one or more of the peripheral devices 115-123 may be external to the housing for the computing unit 103 and connected to the bus 113 through, for example, a Universal Serial Bus (USB) connection.

With some implementations, the computing unit 103 may be directly or indirectly connected to a network interface 115 for communicating with other devices making up a network. The network interface 115 can translate data and control signals from the computing unit 103 into network messages according to one or more communication protocols, such as the transmission control protocol (TCP) and the Internet protocol (IP). Also, the network interface 115 may employ any suitable connection agent (or combination of agents) for connecting to a network, including, for example, a wireless transceiver, a modem, or an Ethernet connection. Such network interfaces and protocols are well known in the art, and thus will not be discussed here in more detail.

It should be appreciated that the computing device 101 is illustrated as an example only, and it not intended to be limiting. Various embodiments may be implemented using one or more computing devices that include the components of the computing device 101 illustrated in FIG. 1, which include only a subset of the components illustrated in FIG. 1, or which include an alternate combination of components, including components that are not shown in FIG. 1. For example, various embodiments may be implemented using a multi-processor computer, a plurality of single and/or multiprocessor computers arranged into a network, or some combination of both.

Figure 2:
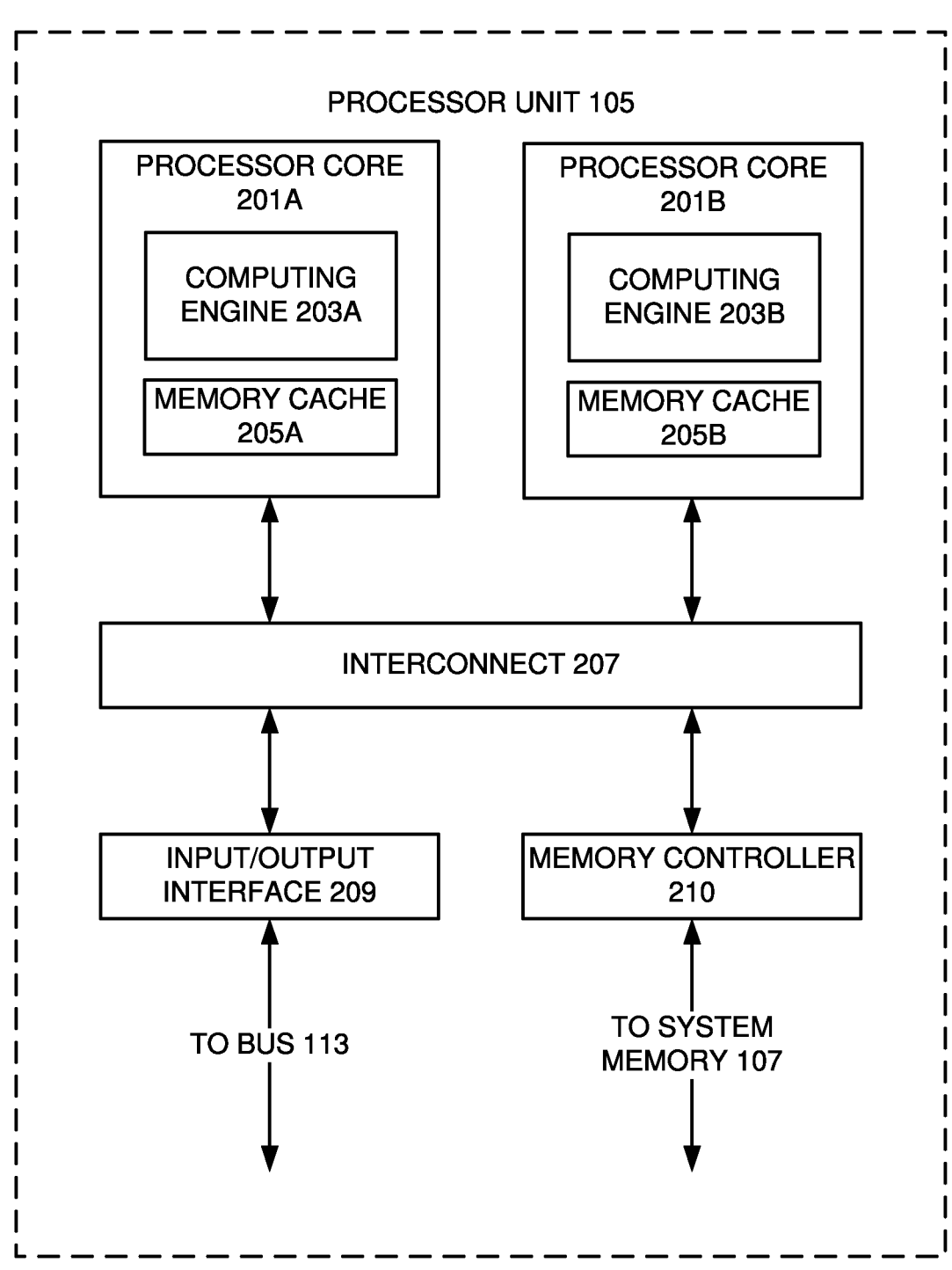

With some implementations, the processor unit 105 can have more than one processor core. Accordingly, FIG. 2 illustrates an example of a multi-core processor unit 105 that may be employed with various embodiments. As seen in this figure, the processor unit 105 includes a plurality of processor cores 201A and 201B. Each processor core 201A and 201B includes a computing engine 203A and 203B, respectively, and a memory cache 205A and 205B, respectively. As known to those of ordinary skill in the art, a computing engine 203A and 203B can include logic devices for performing various computing functions, such as fetching software instructions and then performing the actions specified in the fetched instructions. These actions may include, for example, adding, subtracting, multiplying, and comparing numbers, performing logical operations such as AND, OR, NOR and XOR, and retrieving data. Each computing engine 203A and 203B may then use its corresponding memory cache 205A and 205B, respectively, to quickly store and retrieve data and/or instructions for execution.

Each processor core 201A and 201B is connected to an interconnect 207. The particular construction of the interconnect 207 may vary depending upon the architecture of the processor unit 105. With some processor cores 201A and 201B, such as the Cell microprocessor created by Sony Corporation, Toshiba Corporation and IBM Corporation, the interconnect 207 may be implemented as an interconnect bus. With other processor units 201A and 201B, however, such as the Opteron™ and Athlon™ dual-core processors available from Advanced Micro Devices of Sunnyvale, California, the interconnect 207 may be implemented as a system request interface device. In any case, the processor cores 201A and 201B communicate through the interconnect 207 with an input/output interface 209 and a memory controller 210. The input/output interface 209 provides a communication interface to the bus 113. Similarly, the memory controller 210 controls the exchange of information to the system memory 107. With some implementations, the processor unit 105 may include additional components, such as a high-level cache memory accessible shared by the processor cores 201A and 201B. It also should be appreciated that the description of the computer network illustrated in FIG. 1 and FIG. 2 is provided as an example only, and it not intended to suggest any limitation as to the scope of use or functionality of alternate embodiments.

Figures 3, 5:
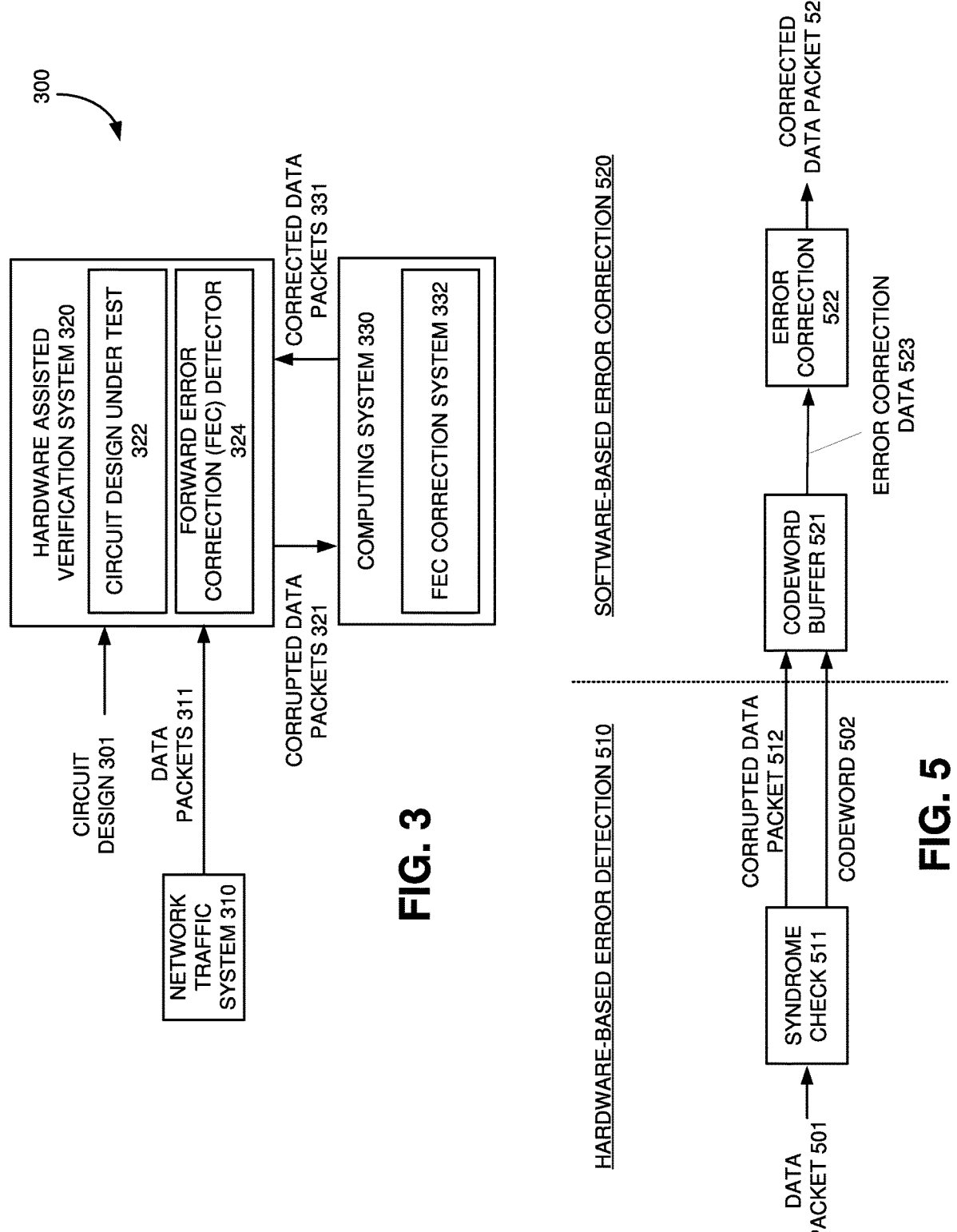
FIG. 3 illustrates an example hardware-assisted verification system with distributed handling of Forward Error Correction according to various embodiments.
FIG. 5 illustrates an example distributed handling of forward error correction according to various embodiments.

Distributed Handling of Forward Error Correction in Hardware Assisted Verification Platforms FIG. 3 illustrates an example design verification system 300 with distributed handling of Forward Error Correction (FEC) according to various embodiments. Referring to FIG. 3, the design verification system 300 can include a hardware assisted verification system 320 that, in a block 401 of FIG. 4, can perform functional verification operations on a circuit design 301, for example, to confirm that an electronic system described by the circuit design 301 can accurately perform functions as expected. The hardware assisted verification system 320 can be an emulation system, a prototyping system, or the like, which can emulate, prototype, or the like, a circuit design under test 322.

The hardware assisted verification system 320 can receive the circuit design 301 modeling model the electronic system at a register transfer level (RTL), for example, with code in a hardware description language (HDL), such as System-Verilog, Very high speed integrated circuit Hardware Design Language (VHDL), System C, or the like. In some embodiments, the circuit design 301 describing the electronic system can be synthesized from the register transfer level representation into a gate-level representation, such as a gate-level netlist, for example, by a synthesis tool. The synthesis operations can include RTL synthesis, which can generate generic gates corresponding to the functionality described in the circuit design 301. The gate-level netlist describing the electronic system can be compiled into a functionally-equivalent model of the gate-level netlist that, when downloaded to the programmable logic devices or Field Programmable Gate Arrays (FPGAs) in the hardware assisted verification system 320, can cause the programmable logic devices or FPGAs in the hardware assisted verification system 320 to implement the electronic system described by the gate-level netlist as the circuit design under test 322.

The hardware assisted verification system 320 also can implement a test bench with the programmable logic devices or FPGAs, which can provide transactions or sets of test vectors to the circuit design under test 322 in the hardware assisted verification system 320. For example, when the hardware assisted verification system 320 emulates the circuit design 301, the hardware assisted verification system 320 can provide transactions or sets of test vectors generated by an emulated test bench to the circuit design under test 322. The hardware assisted verification system 320 can determine how the circuit design under test 322 responded to the transactions or test vectors, and verify, from those responses, that the circuit design 301 describes the electronic system capable of accurately performing desired functions.

The design verification system 300 can include a network traffic system 310, for example, implemented as a computer 101 described above in FIG. 1, to generate data packets 311 for use by the hardware assisted verification system 320 during the verification of the circuit design under test 322. For example, when the circuit design under test 322 corresponds to a networking device, such as a router, switch, gateway, or the like, or corresponds to a central processing unit (CPU), a general processing unit (GPU), a System on a Chip (SOC) device, or the like, the hardware assisted verification system 320 can utilize the data packets 311 as stimulus for the circuit design under test 322. In some embodiments, the network traffic system 310 can include Forward Error Correction (FEC) functionality to add error correction bits, such as parity bits, to the data packets 311 transmitted to the hardware assisted verification system 320. The hardware assisted verification system 320, in a block 402 of FIG. 4, can receive the data packets 311 for use by the emulated electronic system during the functional verification operations.

The design verification system 300 can include FEC functionality to detect corrupted data in the data packets and to attempt to correct the corrupted data using the parity bits added to the data packets 311 by the network traffic system 310. The design verification system 300 can distribute the Forward Error Correction (FEC) functionality between the hardware assisted verification system 320 and a computing system 330, for example, implemented as a computer 101 described above in FIG. 1. Embodiments of the distributed forward error detection and correction are shown in greater detail with reference to FIG. 5.

FIG. 5 illustrates an example distributed handling of forward error correction according to various embodiments. Referring to FIG. 5, the distributed handling of forward error correction can include two phases—hardware-based error detection 510 and software-based error correction 520. The hardware-based error detection 510 can receive a data packet 501 that was transmitted toward a circuit design under test by a hardware-assisted verification system. The hardware-based error detection 510 can include a syndrome check 511 functionality, which can determine a codeword 502 of the data packet 501. In some embodiments, the hardware-based error detection 510 can analyze a data stream from the circuit design under test for specific sync patterns, which can be utilized to identify a boundary for the data packet 501, sometimes a Frame, Flit packet, or the like. The codeword 502 can corresponding to one or more of these blocks of data having been segregated based on the specific protocol. In some examples, the syndrome check 511 functionality can determine the codeword 502 of the data packet 501 by extracting parity bits from the data packet 501 that were added prior to transmission to the hardware-assisted verification system. The syndrome check 511 functionality can utilize the codeword 502 and the data packet 501 to generate a syndrome for the data packet 501. The syndrome check 511 functionality can determine whether the data packet 501 includes any corrupted bits based on the generated syndrome. Since the generation of the syndrome from the data packet 501 and the associated checking operations can be performed often, such as after receipt of each data packet, and without consuming substantial hardware resources, the hardware-based error detection 510 can be implemented in one or more programmable logic devices of the hardware-assisted verification system.

When the syndrome check 511 functionality in the hardware-based error detection 510 detects that the data packet 501 includes one or more corrupted bits, the syndrome check 511 functionality can output the codeword 502 and a corrupted data packet 512 to a software-based error correction 520 phase of the forward error correction operation. In some embodiments, the hardware-assisted verification system implementing the hardware-based error detection 510 can communicate with a computing system implementing the software-based error correction 520 through a co-model link layer of the hardware-assisted verification system.

The software-based error correction 520 can include a codeword buffer 521 to store the codeword 502 and the corrupted data packet 512 for processing by a computing system. The software-based error correction 520 can include an error correction 522 functionality to correct the corrupted bits in the corrupted data packet 512 stored in the codeword buffer 521, for example, utilizing its corresponding code-word 502. The error correction 522 functionality can generate a corrected data packet 524, which can be provided back to the hardware-assisted verification system for use in the functional verification of the circuit design under test. In some embodiments, the corrected data packet 524 also can be retained by the software-based error correction 520 for further processing. Since an actual detection of errors occurs infrequently relative to a frequency of performance of the error detection operations, the bifurcation of the forward error correction operations into a detection phase performed in hardware and a correction phase performed in software allows for a design verification environment to effectively detect and correct data transmission errors, while reducing hardware utilization and/or increasing verification through-put.

Referring back to FIGS. 3 and 4, the hardware assisted verification system 320 can include a FEC detector 324, which can analyze the data packets 311 to detect data corruption. The FEC detector 324, in a block 403, can: identify at least one of the data packets 311 includes one or more corrupted bits. In some embodiments, the FEC detector 324 can receive the data packets 311 and calculate a syndrome, which allows the FEC detector 324 to detect whether the data packets 311 include one or more corrupted bits, for example, due to transmission to the hardware assisted verification system 320. When the FEC detector 324 detects corruption in one of the data packets 311, the FEC detector 324, in a block 404, can transmit the corrupted data packets 321 to the FEC correction system 332 in the computing system 330 for performance of FEC error correction operations based on the identification of the corrupted data packets. In some embodiments, since the hardware assisted verification system 320 has control over the verification clock, the FEC detector 324 also can stop the verification clock in response to the detection of the corrupted data packets 321 to allow the FEC correction system 332 the time to correct errors in the corrupted data packets 321. When the FEC detector 324 does not detect corruption in one of the data packets 311, the FEC detector 324 can allow the data packets 311 to be utilized by the circuit design under test 322 in the hardware assisted verification system 320.

The FEC correction system 332 can perform the error correction operations on the corrupted data packets 321 and provide corrected data packets 331, for example, with the errors corrected, to the hardware assisted verification system 320. The FEC correction system 332, in a block 405, can correct the corrupted data packets 321. The FEC correction system 332, in a block 406, can transmit the corrected data packets 331 to the hardware-assisted verification system 320 for use by the emulated electronic system during the functional verification operations. In some embodiments, the FEC detector 324 can provide the corrected data packets 331 to the circuit design under test 322 during verification operations in the hardware assisted verification system 320. In some embodiments, the corrected data packets 331 also can be retained by the computing system 330 for further processing. In some embodiments, the FEC detector 324 also can restart the verification clock in response to the reception of the corrected data packets 331, which can restart the verification operations of the circuit design under test 322 by the hardware assisted verification system 320. By performing the detection portion of the Forward Error Correction functionality in hardware of the hardware assisted verification system 320 and offloading the error correction portion of the Forward Error Correction functionality to software implemented by the computing system 330, the design verification system 300 can reduce hardware utilization in the hardware assisted verification system 320 and avoid slow verification throughput due to the stopping and restarting of the verification clock for performance of detection operations.

The system and apparatus described above may use dedicated processor systems, micro controllers, programmable logic devices, microprocessors, or any combination thereof, to perform some or all of the operations described herein. Some of the operations described above may be implemented in software and other operations may be implemented in hardware. Any of the operations, processes, and/or methods described herein may be performed by an apparatus, a device, and/or a system substantially similar to those as described herein and with reference to the illustrated figures.

The processing device may execute instructions or "code" stored in memory. The memory may store data as well. The processing device may include, but may not be limited to, an analog processor, a digital processor, a microprocessor, a multi-core processor, a processor array, a network processor, or the like. The processing device may be part of an integrated control system or system manager, or may be provided as a portable electronic device configured to interface with a networked system either locally or remotely via wireless transmission.

The processor memory may be integrated together with the processing device, for example RAM or FLASH memory disposed within an integrated circuit microprocessor or the like. In other examples, the memory may comprise an independent device, such as an external disk drive, a storage array, a portable FLASH key fob, or the like. The memory and processing device may be operatively coupled together, or in communication with each other, for example by an I/O port, a network connection, or the like, and the processing device may read a file stored on the memory. Associated memory may be "read only" by design (ROM) by virtue of permission settings, or not. Other examples of memory may include, but may not be limited to, WORM, EPROM, EEPROM, FLASH, or the like, which may be implemented in solid state semiconductor devices. Other memories may comprise moving parts, such as a known rotating disk drive. All such memories may be "machine-readable" and may be readable by a processing device.

Operating instructions or commands may be implemented or embodied in tangible forms of stored computer software (also known as "computer program" or "code"). Programs, or code, may be stored in a digital memory and may be read by the processing device. "Computer-readable storage medium" (or alternatively, "machine-readable storage medium") may include all of the foregoing types of memory, as well as new technologies of the future, as long as the memory may be capable of storing digital information in the nature of a computer program or other data, at least temporarily, and as long at the stored information may be "read" by an appropriate processing device. The term "computer-readable" may not be limited to the historical usage of "computer" to imply a complete mainframe, mini-computer, desktop or even laptop computer. Rather, "computer-readable" may comprise storage medium that may be readable by a processor, a processing device, or any computing system. Such media may be any available media that may be locally and/or remotely accessible by a computer or a processor, and may include volatile and non-volatile media, and removable and non-removable media, or any combination thereof.

A program stored in a computer-readable storage medium may comprise a computer program product. For example, a storage medium may be used as a convenient means to store or transport a computer program. For the sake of convenience, the operations may be described as various interconnected or coupled functional blocks or diagrams. However, there may be cases where these functional blocks or diagrams may be equivalently aggregated into a single logic device, program or operation with unclear boundaries.

CONCLUSION

While the application describes specific examples of carrying out embodiments of the invention, those skilled in the art will appreciate that there are numerous variations and permutations of the above described systems and techniques that fall within the spirit and scope of the invention as set forth in the appended claims. For example, while specific terminology has been employed above to refer to electronic design automation processes, it should be appreciated that various examples of the invention may be implemented using any desired combination of electronic design automation processes.

One of skill in the art will also recognize that the concepts taught herein can be tailored to a particular application in many other ways. In particular, those skilled in the art will recognize that the illustrated examples are but one of many alternative implementations that will become apparent upon reading this disclosure.

Although the specification may refer to "an", "one", "another", or "some" example(s) in several locations, this does not necessarily mean that each such reference is to the same example(s), or that the feature only applies to a single example.

The invention claimed is:

1. A method comprising:
performing functional verification operations on a circuit design describing an electronic system being emulated by a hardware-assisted verification system;
receiving, by the hardware-assisted verification system, a data packet for use by the emulated electronic system during the functional verification operations by the hardware-assisted verification system;
identifying, by forward error correction (FEC) circuitry implemented in the hardware-assisted verification system, the received data packet includes one or more corrupted bits;
in response to identifying the received data packet includes one or more corrupted bits, transmitting, by the FEC circuitry in the hardware-assisted verification system, the data packet to a computing system for error correction operations, wherein the computing system is external to the hardware-assisted verification system and separate from the FEC circuitry in the hardware-assisted verification system; and
correcting, by the computing system that is external to the hardware-assisted verification system and separate from the FEC circuitry in the hardware-assisted verification system, the one or more corrupted bits in the data packet.

2. The method of claim 1, further comprising pausing, by the hardware-assisted verification system, a verification clock for the functional verification operations on the circuit design in response to the identification that the data packet includes one or more corrupted bits.

3. The method of claim 2, further comprising transmitting, by the computing system, the corrected data packet to the hardware-assisted verification system for utilization in the functional verification operations on the circuit design.

4. The method of claim 3, further comprising restarting, by the hardware-assisted verification system, the verification clock for the functional verification operations on the circuit design in response to the receiving the corrected data packet from the computing system.

5. The method of claim 1, wherein identifying the data packet includes one or more corrupted bits further comprises:
generating, by the FEC circuitry in the hardware-assisted verification system, a code word from the data packet;
determining, by the FEC circuitry in the hardware-assisted verification system, a syndrome based, at least in part, on the code word and one or more parity bits in the data packet; and
ascertaining, by the FEC circuitry in the hardware-assisted verification system, the data packet includes the one or more corrupted bits based on the syndrome.

6. The method of claim 5, wherein transmitting the data packet to the computing system includes transmitting the data packet and the generated code word to the computing system using a co-model link layer of the hardware-assisted verification system.

7. The method of claim 1, wherein the hardware-assisted verification system comprises an emulation system or prototyping system having multiple configurable logic devices to implement the forward error correction circuitry and the electronic system described by the circuit design.

8. A system comprising:
a hardware-assisted verification system to emulate an electronic system described by a circuit design and to receive a data packet for use by the emulated electronic system during functional verification operations of the circuit design, wherein the hardware-assisted verification system is configured to implement forward error correction (FEC) circuitry to identify the received data packet includes one or more corrupted bits; and
a computing system, in response to execution of computer-executable instructions stored in a memory system, is configured to receive the data packet transmitted by the hardware verification system in response to the identification of the data packet including one or more corrupted bits, wherein the computing system is external to the hardware-assisted verification system and separate from the FEC circuitry in the hardware-assisted verification system, and wherein the computing system is configured to correct the one or more corrupted bits in the data packet.

9. The system of claim 8, wherein the hardware-assisted verification system is configured to pause a verification clock for the functional verification operations on the circuit design in response to the identification that the data packet includes one or more corrupted bits.

10. The system of claim 9, wherein the computing system, in response to execution of the computer-executable instructions, is further configured to transmit the corrected data packet to the hardware-assisted verification system for utilization in the functional verification operations on the circuit design.

11. The system of claim 10, wherein the hardware-assisted verification system is configured to restart the verification clock for the functional verification operations on the circuit design in response to the receiving the corrected data packet from the computing system.

12. The system of claim 8, wherein the hardware-assisted verification system is configured to identify the data packet includes one or more corrupted bits by:

generate, with the FEC circuitry in the hardware-assisted verification system, a code word from the data packet;

determining, with the FEC circuitry in the hardware-assisted verification system, a syndrome based, at least in part, on the code word and one or more parity bits in the data packet; and ascertaining, with the FEC circuitry in the hardware-assisted verification system, the data packet includes the one or more one or more corrupted bits based on the syndrome.

13. The system of claim 12, wherein the hardware-assisted verification system is configured to transmit the data packet and the generated code word to the computing system using a co-model link layer of the hardware-assisted verification system.

14. The system of claim 8, wherein the hardware-assisted verification system comprises an emulation system or prototyping system having multiple configurable logic devices to implement the forward error correction circuitry and the electronic system described by the circuit design.

*    *    *    *    *